United States Patent
> Adams

[15] 3,640,133
[45] Feb. 8, 1972

[54] FLOWMETER
[72] Inventor: Robert B. Adams, Tredyffrin Township, Chester County, Pa.
[73] Assignee: Moore Products Co., Spring House, Pa.
[22] Filed: Jan. 10, 1969
[21] Appl. No.: 790,408

Related U.S. Application Data
[63] Continuation-in-part of Ser. No. 618,472, Feb. 24, 1967.

[52] U.S. Cl. ........................................73/194 B, 137/81.5
[51] Int. Cl. ..................................................G01f 1/00
[58] Field of Search .........................73/194; 137/81.5

[56] References Cited

UNITED STATES PATENTS

| | | | |
|---|---|---|---|
| 3,273,377 | 9/1966 | Testerman et al. | 73/23.1 |
| 3,238,960 | 3/1966 | Hatch | 137/81.5 |
| 2,453,376 | 11/1948 | Lagasse | 73/194 |
| 3,279,251 | 10/1966 | Chanaud | 73/194 |
| 3,442,124 | 5/1969 | Warren et al. | 73/194 |

Primary Examiner—Richard C. Queisser
Assistant Examiner—Arthur E. Korkosz
Attorney—Zachary T. Wobensmith, II

[57] ABSTRACT

A flowmeter is provided having a through passageway for the flow to be measured with a fluid interaction chamber and feedback means to provide an oscillation of the flow. The frequency of this oscillation is linearly and proportionally related to volume rate of flow and is independent of all fluid properties in the turbulent range. That is to say that the frequency for a given volume flow rate will be the same for any liquid or gas as long as the flow is turbulent. Provisions are made for detecting this oscillation including means for reducing the turbulence at the detecting location and a sensor which is responsive to changes in the heat transfer rates to the surrounding fluid medium.

15 Claims, 12 Drawing Figures

INVENTOR
ROBERT B. ADAMS

BY B.T. Wobensmith

ATTORNEY

FIG. 3
FIG. 4
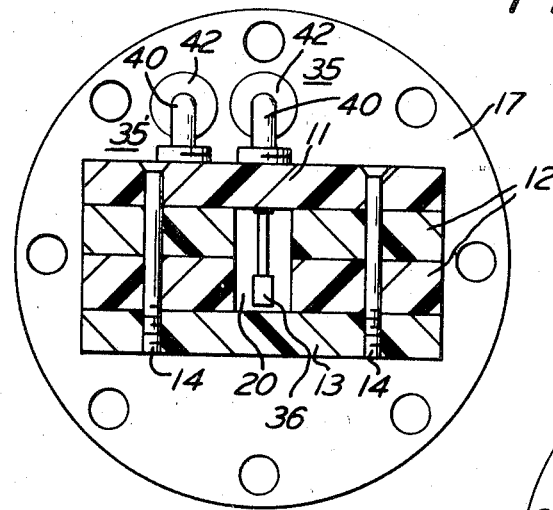
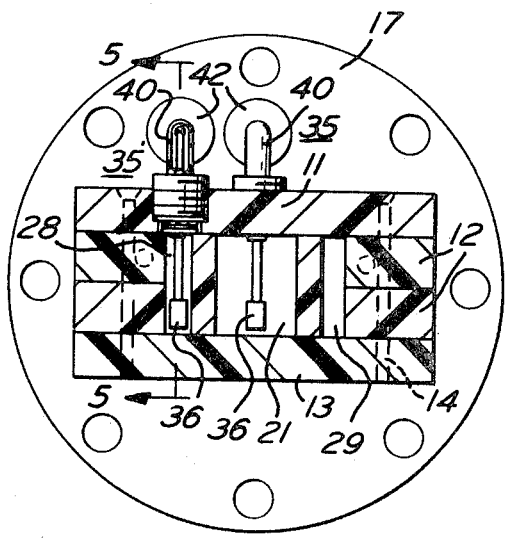
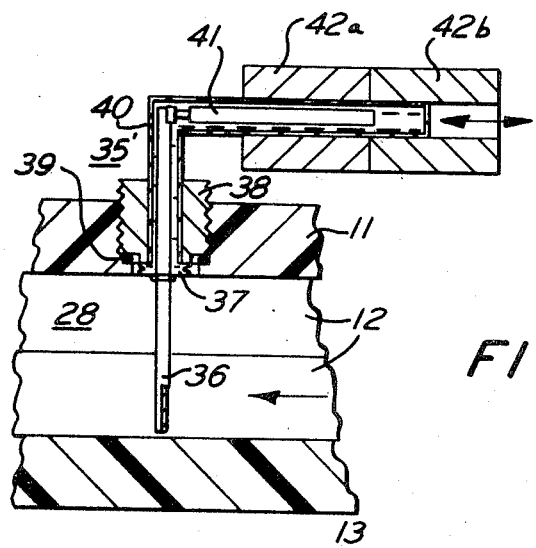
FIG. 5
FIG. 6
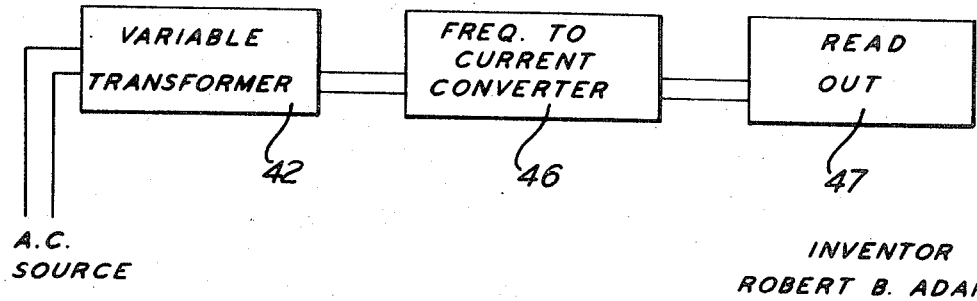
INVENTOR
ROBERT B. ADAMS
BY
J. T. Wobensmith
ATTORNEY

INVENTOR
ROBERT B. ADAMS
ATTORNEY

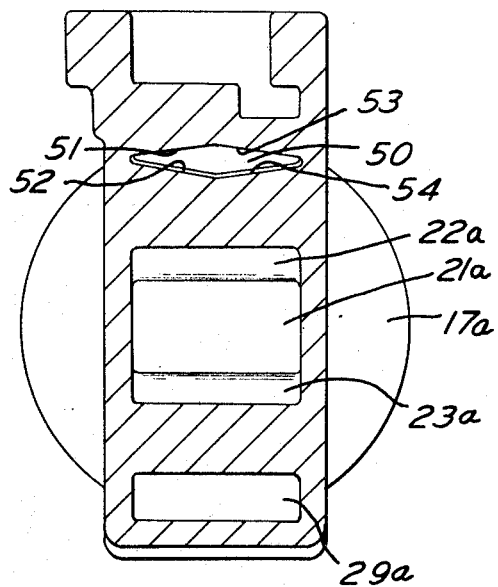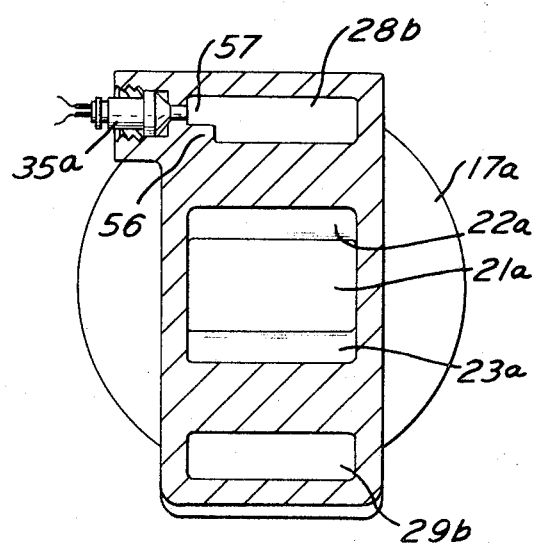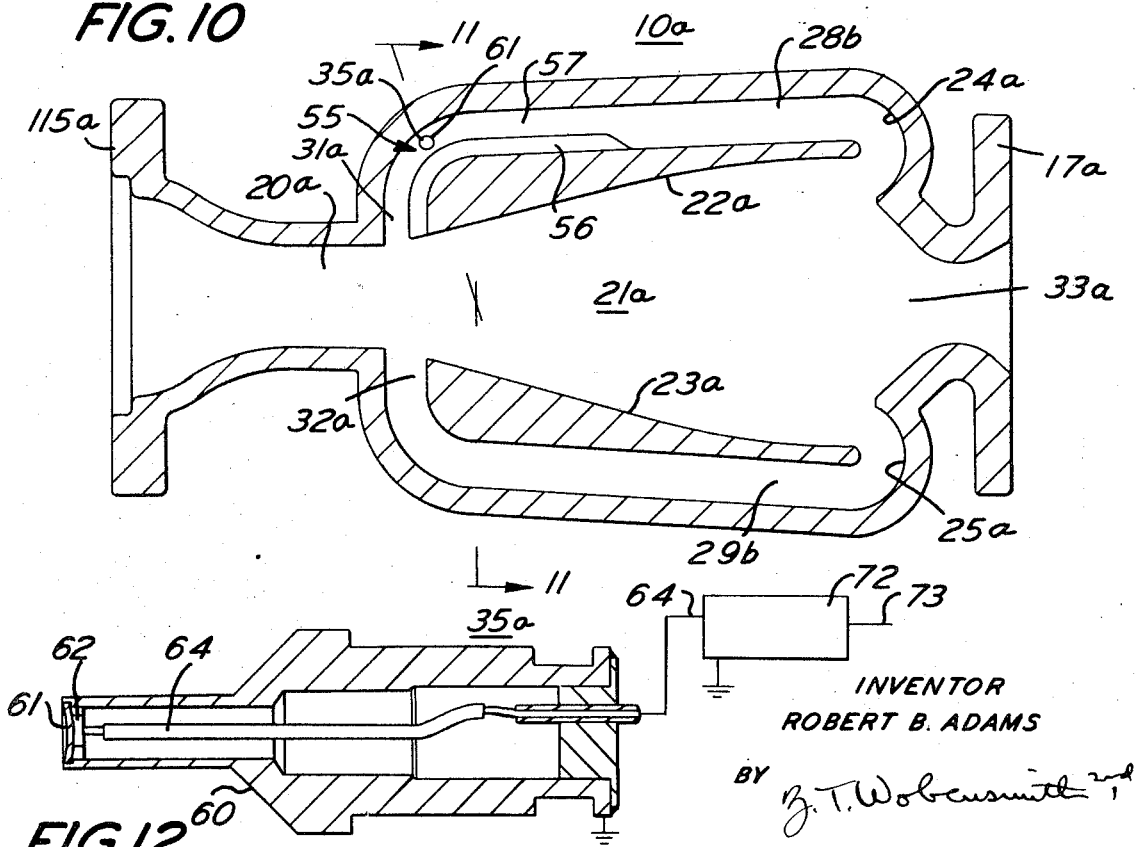

FLOWMETER

CROSS REFERENCE TO RELATED APPLICATION

This application is a continuation-in-part of my prior application for patent for Flowmeter, filed Feb. 24, 1967, Ser. No. 618,472.

BACKGROUND OF THE INVENTION

1. Field of the Invention

The present invention relates to flowmeters utilizing the principles of pure fluid amplifiers in which a frequency is established corresponding to a particular flow, the frequency being measured to determine the flow.

2. Description of the Prior Art

It has heretofore been proposed to provide fluid oscillators with feedback without the use of moving parts. Warren, in U.S. Pat. No. 3,158,166, shows several oscillators whose frequency depends on the delay incorporated in the length of the feedback path. Of these oscillators he teaches "The maximum frequency at which the oscillators will operate is dependent upon the speed of the feedback fluid wave, that is, the local speed of sound; the distance the wave has to travel; that is the length of the feedback loop; and the transit time needed for switching of the power stream." He further points out that the frequency depends upon the type of fluid employed. In making these statements it appears that Warren was thinking about a compressible fluid. Therefore, it is obvious from this teaching that when the pressure of fluid power source is increased, thus increasing the flow, that the frequency cannot change proportionally with the flow. The part of the delay caused by the feedback loop will not change since the sonic velocity will be unchanged as it is dependent only upon fluid temperature in the feedback path, specific heat ratio, and gas constant. Taplin in U.S. Pat. No. 3,373,600 also describes a device which makes use of the delay caused by the length of the feedback loop in order to measure such fluid properties as density, temperature, bulk modulus, enthalpy and quality. Again, because the delay of the feedback line is independent of the fluid source pressure or fluid flow through the device there would not be a linear relation between the volume flow of a compressible fluid and frequency. Furthermore, the devices of either patent would have different relationships between frequency and volume flow rate for different fluids. This is because feedback time delay for incompressible fluids would be primarily due to the inertia effect of the feedback line whereas for compressible fluids it would depend upon the sonic velocity of the pressure wave.

Hatch, in U.S. Pat. No. 3,238,960, shows a fluid oscillator whose frequency is linearly related to differential pressure rather than flow. When adapted to flow measurement it does not have straight through passage of the fluid flow being measured.

Other oscillators shown by Warren, U.S. Pat. No. 3,016,066, and Metzger, U.S. Pat. No. 3,276,464, depend on the delay of feedback in a loop between the control ports and for a gas this delay depends upon the sonic speed. For the reason mentioned earlier in connection with the other Warren patent and Taplin patent, this would not produce a result suitable for flow measurement.

Warren, U.S. Pat. Nos. 3,093,306 and 3,158,166, Horton, U.S. Pat. No. 3,185,166, Reader, U.S. Pat. No. 3,159,168, Testerman, U.S. Pat. No. 3,273,377, all show oscillators whose timing depends primarily either upon sonic velocity, capacitive effects or inertance in a feedback loop external to the interaction chamber. Capacitive delays are effective only with gases. This approach cannot be utilized to obtain an oscillator with incompressible fluids unless moving parts are employed Furthermore, it has been found with gases that capacitive delays are not effective for obtaining a linear relationship with flow. It is not possible to obtain true inertance effects in a length of feedback passageway with compressible fluids. When this is attempted the result is a delay dependent upon the local speed of sound which for reasons given before are not satisfactory for obtaining the objects of this invention.

All of the above U.S. patents share in common that the only approach for obtaining an oscillation is to introduce a prime delay in the feedback means external to the interaction chamber of the device, whereas in the present invention the prime time delay is obtained outside the feedback means. Also, in the prior patents referred to, the source flow leaves the interaction chambers of these inventions through separated discharge passageways. There is no through flow or flow to a single exit.

SUMMARY OF THE INVENTION

In accordance with the present invention, a flowmeter is provided with through flow and having provisions for setting up a frequency proportional to volume flow rate, this relationship being the same for any compressible or incompressible fluid as long as the flow is turbulent and subsonic, with passageways shaped to provide minimum permanent pressure loss and the maximum possible frequency.

It is an object of the present invention to provide a flowmeter in which a frequency proportional to volume flow is set up without moving parts and the frequency is advantageously detected in a location where turbulence and noise are reduced, and the measurement is made available as either a digital or analog signal.

It is a further object of the present invention to provide a flowmeter which can be employed in a fluid flow line without interposing any substantial resistance to fluid flow.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which:

FIG. 3 is a transverse-sectional view, taken approximately on the line 3—3 of FIG. 2;

FIG. 4 is a transverse-sectional view, taken approximately on the line 4—4 of FIG. 2;

FIG. 5 is a transverse-sectional view, enlarged, taken approximately on the line 5—5 of FIG. 4;

FIG. 6 is a diagrammatic view of a circuit suitable for use with the invention for providing an electric current output proportional to flow;

FIG. 9 is a transverse-sectional view, taken approximately on the line 9—9 of FIG, 8;

FIG. 10 is a view similar to FIG. 8 showing another embodiment of the flowmeter of the present invention;

FIG. 11 is a transverse-sectional view, taken approximately on the line 11—11 of FIG. 10; and FIG. 12 is a view partly in longitudinal section and enlarged and partly diagrammatic of a thermistor-type detector or pickup unit.

Figure 1:
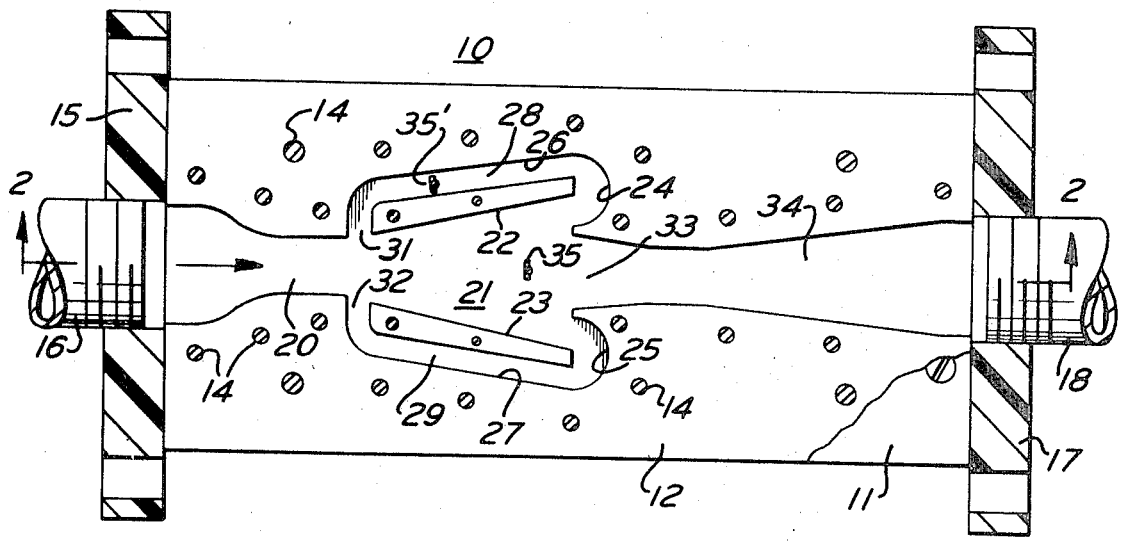
FIG. 1 is a view in elevation of one embodiment of a flowmeter in accordance with the invention, parts being broken away to show the internal construction.
Figure 2:
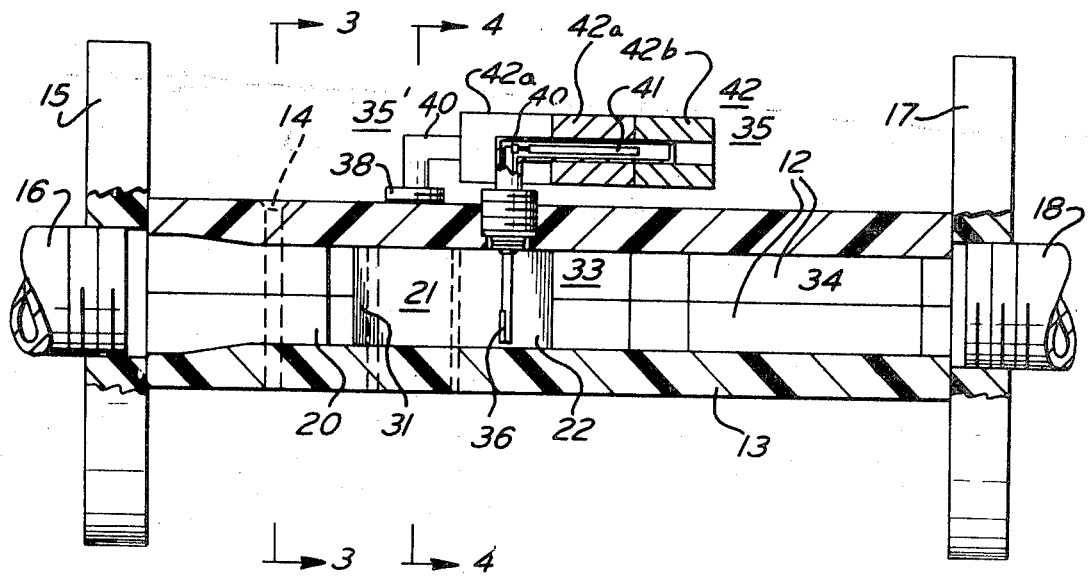
FIG. 2 is a longitudinal sectional view, taken approximately on the line 2—2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to FIGS. 1 to 6 of the drawings, a housing 10 is provided, which may be made of a sandwich construction with an upper cover plate 11, an intermediate plate assembly 12, and a lower cover plate 13, secured together in any desired manner, such as by screws 14. The housing 10 can also be provided with an inlet flange 15 for the connection of a supply fluid connection 16, and an outlet flange 17 for the connection of a delivery fluid connection 18.

The intermediate plate assembly 12 is provided with a nozzle 20 for delivery of fluid into an interaction or steering chamber 21 which is aligned therewith and has diverging sidewalls 22 and 23 onto either of which fluid from the nozzle 20 can lock, as hereinafter explained.

The sidewalls 22 and 23 have therebeyond curved walls 24 and 25 which provide, with the walls 22 and 23 and with sidewalls 26 and 27, feedback paths 28 and 29 on each side of the chamber 21. Control nozzles 31 and 32 on each side and at the inner terminal of the nozzle 20 provide for communication of the feedback paths 28 and 29 with the chamber 21.

The chamber 21 also has a discharge passageway 33 aligned with the nozzle 20 and can have a diverging recovery passageway 34 aligned therewith for pressure recovery.

At a selected location within the housing 10 which may be in the chamber 21 upstream of the discharge passageway 33, or which may be in one of the feed back paths such as the feedback path 28, or at both locations, a fluid movement detector 35 or 35' is provided for transmitting pulses responsive to oscillations of fluid within the housing, and in the chamber 21 or in the feedback path 28, or both.

For this purpose, and merely by way of example, the detector 35 or 35', which may be of identical construction, has an arm 36 mounted in a sealing bellows 37 with the bellows 37 held in place by a nut 38 and with a seal 39, such as an O-ring to prevent fluid leakage. The arm 36 can extend within an L-shaped tube 40 within which a transformer core 41 is also provided for oscillation by the arm 36. The interior of the tube 40 can be oil filled to eliminate any pressure drop across the bellows 37 and to provide damping. A transformer 42 is provided having a primary winding 42a and a secondary winding 42b within which the core 41 is movable to provide a variable transformer.

As illustrated in FIG. 6, the variable transformer 42 can be excited by an alternating current source whose frequency is at least several times higher than the maximum frequency of the fluid oscillator and its output may be rectified, filtered clipped and integrated, such as by a frequency to current converter 46 to obtain an analog electric current proportional to the fluid oscillator frequency. The analog signal is suitable for indicating, recording or controlling the fluid flow, as desired, and available at a read out device 47.

An alternate mode of utilizing the signal from the sensing means would be to rectify, filter, shape and amplify the frequency into square wave pulses suitable for use with any counter so as to obtain indication of the total volume passed through the flowmeter.

The mode of operation will now be pointed out.

Assume that fluid is supplied through the supply fluid connection 16, and through the nozzle 20 into the steering chamber 21. If the fluid jet entering the chamber 21 from the nozzle 20 is in the position such that it is attached to the wall 23, a portion of this jet guided by curved wall 25 will enter feedback passage 29 and flow toward control nozzle 32. At this time, because of the counterclockwise circulation of the flow in the steering chamber 21 and the converging shape at the passageway 33 there is very little tendency, if any, for flow to occur in the feedback path 28. When the flow in feedback passage 29 reaches the control nozzle 32 it deflects the jet from the nozzle 20 toward the wall 22. However, because the jet from the nozzle 20 just prior to this occurrence is still moving along the wall 23, the feedback which produces the back flow along the path 29 continues for a time after the initial switching action so as to insure a complete and positive switching of the entire jet from the nozzle 20 to the wall 22.

After the jet is completely attached to the wall 22, it feeds fluid guided by the curved wall 24 back through the feedback path 28 and back toward control nozzle 31 where it will act to return the jet from the nozzle 20 toward the sidewall 23.

It has been found by experiment, that when the lengths of the feedback paths are kept short enough that the prime time delay determining the half period of oscillation occurs between the point at which the jet is first switched by a control port to the opposite wall and the time at which the new position of the jet is fully established and begins to exert force on the feedback passage associated with the new wall, that two very useful and new results are obtained. First the frequency of oscillation obtained with a compressible fluid in the subsonic turbulent range is now proportional with volume flow rate. Second, the relationship between volume flow rate and frequency is the same for all liquids and gases in the turbulent range. Therefore, the new sand useful result that is obtained is a volume flow meter whose calibration is independent of fluid properties.

The inlet nozzle 20 can be as large as the internal cross section of the pipe 16 and thereby avoid any constrictive action upon the main flow. The inlet nozzle 20 can be made smaller than the internal pipe cross section area to obtain a higher frequency of oscillation at a given flow rate in order to provide better frequency response at the lower flow values.

The lengths of the walls 22 and 23 must be such that the jet from the nozzle 20 can respectively attach to the walls 22 and 23 and the paths 28 and 29 must be kept short enough that the delay in the feedback lines is a small or lesser factor in the timing of the oscillations and does not adversely effect the linearity with compressible fluids or the independence of calibration from fluid properties.

Increasing the ratio of the height of the nozzle 20 to its width permits the nozzle 20 to be narrower thereby giving a high frequency for a given flow.

The diverging shape of the passageway 34 is effective to reduce the overall permanent loss when a constricted inlet nozzle 20 is employed.

The arm 36, by its oscillations with the changes in magnitude of flow in the feedback path 28, thus oscillates at the frequency of the main flow oscillation. The motion of the arm 36 can be sensed in any desired manner, such as by the transformer 42, to provide a signal which fluctuates at the frequency of the main flow oscillation and this fluctuating signal can be converted or utilized in any desired manner, such as to provide at the read out device 47, an analog signal proportional to the frequency of oscillation.

This analog signal is also proportional to the flow through the nozzle 20 because of the frequency of oscillation is linearly related to the flow.

The arm 36 of detector 35 oscillates at twice the frequency of the main flow oscillation, since the jet from the nozzle 20 impinges upon it twice during each cycle; once as the jet is switched from wall 23 to the wall 22 and again when the jet is switched from wall 22 back to wall 23. Thus, the output of detector 35 has twice the frequency of the output of detector 35' and it is thereby possible to extend the useful range of the flow meter by using the output from detector 35' for relatively high flows and high frequencies of oscillation and the output of detector 35 for lower flows and correspondingly lower frequencies of oscillation.

Referring now to FIGS. 7 to 11, inclusive, a housing 10a is provided which may be made as a casting with an inlet flange 15a for the connection of a fluid supply connection (not shown) and an outlet flange 17a for the connection of a delivery fluid connection (not shown).

The housing 10a is provided with a nozzle 20a for delivery of fluid into an interaction or steering chamber 21a which is aligned therewith and has diverging sidewalls 22a and 23a onto either of which fluid from the nozzle 20a can lock.

The side walls 22a and 23a have therebeyond curved walls 24a and 25a which provide, with the walls 22a and 23a, feedback paths 28a and 29a, in FIGS. 7, 8 and 9, and 28b and 29b in FIGS. 10 and 11 on each side of the chamber 21a. Control nozzles 31a and 32a on each side and at the inner terminal of the nozzle 20a provide for communication of the feed paths 28a, 28b and 29a, 29b with the chamber 21a.

The chamber 21a also has a discharge passageway 33a aligned with the nozzle 20a.

Figure 7:
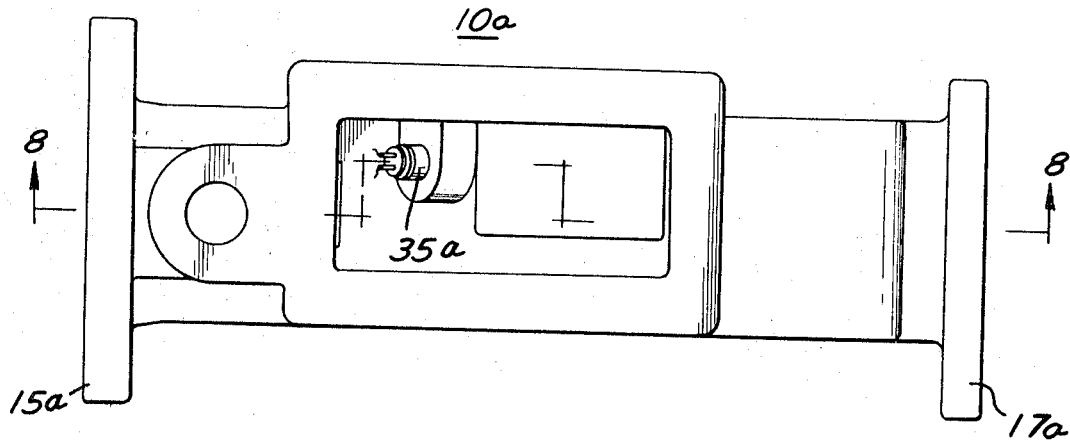
FIG. 7 is a view in side elevation of another embodiment of the flowmeter of the present invention.
Figure 8:
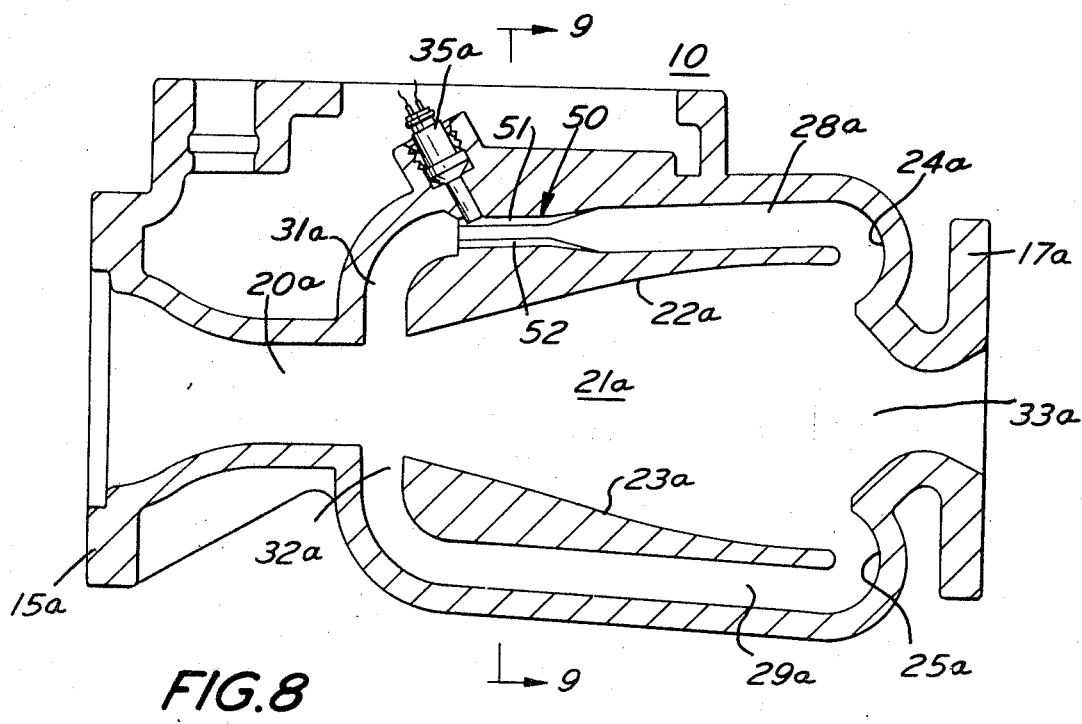
FIG. 8 is a longitudinal sectional view, taken approximately on the line 8—8 of FIG. 7.

In the embodiment of the flowmeter shown in FIGS. 7, 8 and 9, one of the feedback paths, such as the feedback path 28a, has a portion 50 thereof shaped to reduce turbulence and for this purpose, as can be seen in FIG. 9, is of reduced cross section with opposite pairs of converging wall portions 51, 52 and 53, 54.

The detector 35a is mounted in the housing 10a so as to project into the portion 50. The detector 35a, which is illustrated in FIG. 12, preferably includes a metallic housing 60 having a metallic end closure cup 61 with which a thermistor 62 is in direct contact.

An insulated conductor 64 provides one electrical contact for the thermistor 62, the other contact being provided by the grounded body 60. The conductor 64 is connected to a control device 72 of well-known type for making a signal available through conductor 73 in response to electrical resistance changes of the thermistor 62.

An electric current passing through the thermistor 62 heats it to a temperature above that of the surrounding fluid.

Velocity changes in the surrounding fluid will affect the rate of heat loss from the thermistor 62 so that its temperature also will change. Since the electrical resistance of a thermistor varies substantially with temperature a voltage signal will be present across its terminals and, this voltage will fluctuate at the frequency of the fluid velocity changes.

In the embodiment of the flowmeter shown in FIGS. 10 and 11, one of the feedback paths, such as the feedback path 28b, has a portion 55 shaped to reduce turbulence and for this purpose has a rib 56 formed therein to provide a channel 57 for providing a region of reduced turbulence in the feedback path 28b. The detector 35a preferably has its sensitive end extending into the channel 57.

The mode of operation of the embodiments shown in FIGS. 7 to 11, inclusive, is similar to that previously described but with a different character of take off by the thermistor 35a and at a location of reduced turbulence, as at the portions 50 and 55.

I claim:

1. a flow-sensitive device comprising
a housing having wall portions providing,
a fluid inlet nozzle having a connection to a source of fluid for providing a fluid jet,
said nozzle passing all of the flow to be measured,
an interaction chamber with which said nozzle is in communication,
said interaction chamber having opposite diverging sidewalls for fluid jet attachment and a discharge passageway,
control ports communicating with said chamber contiguous to said nozzle,
feedback means connected to said interaction chamber upstream of said discharge passageway and aligned with the jet attached to said sidewalls to receive a portion of fluid coming from said fluid inlet nozzle and extending to said control ports for switching the fluid from said nozzle successively with respect to said sidewalls for establishing a fluid oscillation, and
a member responsive to said fluid oscillation for transmitting a signal related thereto,
said device incorporating means for producing a prime time delay for determining the period of oscillation,
said time delay occurring between the time of first switching of the jet from the nozzle and the time at which a portion of the jet is received by said feedback means.

2. A flow-sensitive device as defined in claim 1 in which said fluid oscillations have a frequency proportional to volume flow rate through said nozzle.

3. A flow-sensitive device as defined in claim 1 in which said interval provides a proportional relationship in the turbulent range between volume flow rate and frequency independent of the type of fluid employed.

4. A flow-sensitive device as defined in claim 1 in which said member is situated in one of said feedback means.

5. A flow-sensitive device as defined in claim 1 in which said member is situated in said interaction chamber.

6. A flowmeter as defined in claim 1 in which
said discharge passageway comprises
a single discharge passageway communicating with said interaction chamber for delivering all the fluid flow from said inlet nozzle.

7. A flow-sensitive device as defined in claim 6 in which a recovery passageway is provided beyond said discharge passageway.

8. A flow-sensitive device as defined in claim 1 in which said device is a flowmeter and
said member has a portion disposed within said housing, and
said member is responsive to changes in the heat transfer rates from it to the surrounding fluid medium.

9. A flow-sensitive device comprising
a housing having wall portions providing
a fluid inlet nozzle having a connection to a source of fluid providing a fluid jet,
an interaction chamber with which said nozzle is in communication,
control ports communicating with said chamber contiguous to said nozzle,
said interaction chamber having opposite diverging sidewalls for fluid jet attachment, and
feedback connections beginning at receiving openings within said interaction chamber aligned with the jet attached to said sidewalls and extending to said control ports for switching the fluid from said nozzle successively with respect to said sidewalls for establishing a fluid oscillation,
said interaction chamber incorporating means for providing a prime time delay for determining the period of oscillation between the time of first switching of the jet from the nozzle and the time at which a portion of the jet is received by said feedback means, and
a member responsive to said fluid oscillation for transmitting a signal related thereto.

10. A fluid oscillator comprising
means directing a fluid stream therethrough and imparting to the fluid of said stream an oscillation whose frequency is directly proportional to the velocity of the fluid stream,
said means including
an elongated interaction chamber bounded by a pair of spaced walls and substantially normal thereto a pair of diverging sidewalls for fluid jet attachment.
a nozzle at one end of said chamber for directing a fluid jet into said chamber,
a discharge passageway at the other end of said chamber through which all the fluid from said nozzle is discharged,
control ports communicating with said chamber contiguous to said nozzle, and
feedback passageways connected to said control ports from locations in said chamber upstream of said discharge passageway and downstream of said sidewalls,
said locations being aligned with the fluid jet attached to said sidewalls,
the space between sidewalls being unobstructed between said nozzle and said locations.

11. A fluid oscillator as defined in claim 10 in which the feedback connections are of such length that the prime time delay is determined by the dimensions of the interaction chamber.

12. A flow-sensitive device comprising
a housing having wall portions providing, a fluid inlet nozzle connected to a source of fluid for providing a fluid jet, an interaction chamber with which said nozzle is in communication, control ports communicating with said chamber contiguous to said nozzle, said interaction chamber having opposite diverging sidewalls for fluid jet attachment and a discharge passageway, feedback means connected to said interaction chamber upstream of said discharge passageway and aligned with the jet attached to said sidewalls to receive a portion of fluid coming from said fluid inlet nozzle and extending to said ports for switching the fluid from said nozzle successively with respect to said sidewalls for establishing a fluid oscillation, and a condition-responsive member responsive to such fluid oscillation and situated in one of said feed means and having means for reducing the turbulence contiguous thereto, the period of oscillation of said device being principally proportional to the interval from the time the jet is first deflected toward one of said opposite sidewalls until the first time thereafter that a portion of the jet is received by the feedback means for returning it from the last said opposite sidewall.

13. A flow-sensitive device as defined in claim 12 in which said means comprises a passageway of reduced cross section.

14. A flow-sensitive device as defined in claim 12 in which said means comprises a channel along said feedback connection.

15. A flow-sensitive device comprising a housing providing a fluid inlet nozzle having a connection to a source of fluid for producing a fluid jet, an interaction chamber for receiving said jet, a control port communicating with said chamber contiguous to said nozzle, means for cyclically varying the location of the path of said jet through said interaction chamber, said means including a fluid passageway having an inlet opening within said interaction chamber for receiving a portion of said jet and extending to said control port for urging the jet away from said receiving means, and other means for deflecting the jet toward said receiving means, said fluid-receiving means being in an unobstructed straight fluid jet flow path from said nozzle, the period of said cyclic variation being principally proportional to the interval in each cycle from the time the jet is first deflected toward said receiving means until the time a portion of the jet reaches said receiving means, and a member responsive to said cyclic variation for transmitting a signal related thereto.

* * * * *

Disclaimer 3,640,133.—*Robert B. Adams*, Tredyffrin Township, Chester County, Pa. FLOWMETER. Patent dated Feb. 8, 1972. Disclaimer filed Jan. 31, 1980, by the inventor and *Moore Products Co.*, the assignee consenting.

Hereby enters this disclaimer to claims 10 and 11 of said patent.

[*Official Gazette, April 1, 1980.*]